United States Patent [19]

Cartret et al.

[11] Patent Number: 4,628,447
[45] Date of Patent: Dec. 9, 1986

[54] MULTI-LEVEL ARBITRATION SYSTEM FOR DECENTRALLY ALLOCATING RESOURCE PRIORITY AMONG INDIVIDUAL PROCESSING UNITS

[75] Inventors: Roger Cartret; Giovanni Volpe, both of Colombes, France

[73] Assignee: Thomson CSF Telephone, Paris, France

[21] Appl. No.: 667,391

[22] Filed: Nov. 2, 1984

Related U.S. Application Data

[63] Continuation of Ser. No. 281,108, Jul. 7, 1981, abandoned.

[30] Foreign Application Priority Data

Jul. 8, 1980 [FR] France ................ 80 15156
Jul. 31, 1980 [FR] France ................ 80 16921

[51] Int. Cl.[4] .................. G06F 15/16; G06F 13/18
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,353,160 | 11/1967 | Linquist | 340/825.02 |
| 3,633,163 | 1/1972 | Birchmeier | 340/825.02 |
| 3,735,357 | 5/1973 | Yates | 364/200 |
| 3,820,079 | 6/1974 | Bergh et al. | 364/200 |
| 3,983,540 | 9/1976 | Keller et al. | 364/200 |
| 4,096,569 | 6/1978 | Barlow | 364/200 |
| 4,314,335 | 2/1982 | Pezzi | 364/200 |
| 4,326,250 | 4/1982 | McCullough | 364/200 |
| 4,328,543 | 5/1982 | Brickman et al. | 364/200 |
| 4,332,011 | 5/1982 | Epstein et al. | 364/200 |
| 4,373,183 | 2/1983 | Means et al. | 364/200 |
| 4,384,323 | 5/1983 | Ahuja | 364/200 |
| 4,395,753 | 7/1983 | Comfort | 364/200 |
| 4,409,656 | 10/1983 | Andersen et al. | 364/200 |
| 4,445,172 | 4/1984 | Peters et al. | 364/200 |
| 4,449,183 | 5/1984 | Flahive | 364/200 |
| 4,468,738 | 8/1984 | Hansen et al. | 364/200 |
| 4,485,436 | 11/1984 | Austruy | 364/200 |
| 4,493,036 | 1/1985 | Boudreau et al. | 364/200 |

OTHER PUBLICATIONS

F. E. Strietelmeier, *Arbitration Array for Device Connection to I/O Channels*, IBM Tech. Disol. Bull., (vol. 22, No. 12, May 1980), pp. 5237-5238.

K. S. Hojberg, *One-Step Programmable Arbiters for Multiprocessors*, Computer Design, (Apr. 1978), pp. 154-156, 158.

*Primary Examiner*—Archie E. Williams, Jr.
*Attorney, Agent, or Firm*—Cushman, Darby & Cushman

[57] ABSTRACT

A decentralized arbitrator includes an individual elementary arbitrator and a level elementary arbitrator for each arbitration unit. Determination of the priority due to one unit, when no other unit claims priority, is accelerated by directing the request states of all units on the same level and on all other levels to the input of an AND gate, the output of which is connected to the bus-utilization enablement input of the relevant unit, through an OR gate and a D flip-flop.

2 Claims, 2 Drawing Figures

MULTI-LEVEL ARBITRATION SYSTEM FOR DECENTRALLY ALLOCATING RESOURCE PRIORITY AMONG INDIVIDUAL PROCESSING UNITS

This is a continuation of application Ser. No. 281,108, filed July 7, 1981, now abandoned.

BACKGROUND OF THE INVENTION

This invention concerns a process for accelerated arbitration among several individual processing units, and an arbitration device for a multiprocessor system.

The article on pages 154 to 158 of the journal "Computer Design" for April 1978 describes an arbitration process and device for a multiprocessor system comprising several identical processing units, all connected to the same bus. This is a synchronous arbitrator, which allows rotating priority to be established among the various processing units, so that the bus will not be monopolized by any one of them, and so that processing by the multiprocessor system will be as fast as possible. This arbitrator principally comprises a read-only memory, in which all possible configurations of bus reservation requests and corresponding states are stored.

This existing device requires a large number of connecting wires between the arbitrator and the various processing units, which could prove troublesome when many such units are involved.

Furthermore, the size of the read-only memory used in this arbitrator depends on the number of processing units co-operating with it. If the number of such units is small, read-only storage capacity for the arbitrator is correspondingly low, and the arbitrator is inexpensive and simple to produce; however, if the number of units is high, several large-capacity memories are needed, and the arbitrator becomes complicated and costly.

This invention concerns an arbitration process for several processing units, that allows priorities to be established easily and quickly, even where a large number of units is involved, and also allows determination of priority to be accelerated when only one unit claims priority.

The invention also concerns an arbitration device that overcomes the drawbacks of existing devices, and is simple and inexpensive to produce.

SUMMARY OF THE INVENTION

In this new arbitration process, processing units are divided up into several sets or "levels", preferably with the same number of units in each, and one or more priorities, reserved for individual levels, are allocated in the course of a principal cycle, one or more priorities, reserved for individual processing units on each level, are allocated in the course of secondary cycles, the duration of a secondary cycle being equivalent to that of several principal cycles, and the point in time is established for each processing unit claiming use of the bus, at which priority falls firstly to the level to which it belongs, and, secondly, to the particular processing unit involved, and if a single unit claims priority, this is granted to it immediately, without initiating a cycle.

According to a recommended feature of the invention, one priority is reserved for each level, in the principal cycle, in a predetermined order, and one priority is reserved for each processing unit on each level, in the secondary cycles, also in a predetermined order.

According to another feature of the invention, processing units on each level, or on some of them, are divided up into several sub-levels, and one or more priorities, reserved for individual levels, are allocated in the course of a principal cycle, one or more priorities, reserved for individual sub-levels, are allocated in the course of secondary cycles, one or more priorities, reserved for individual processing units on each sub-level, are allocated in the course of tertiary cycles, the duration of a secondry cycle being equivalent to that of several principal cycles, and the duration of a tertiary cycle being equivalent to that of several secondary cycles, and the point in time is established, for each processing unit, at which priority falls, firstly to the level to which it belongs, secondly, to the sub-level to which it belongs, and, thirdly, to the particular unit involved.

This new arbitration device is applied to p×n processing units, divided up among p levels each comprising n units, and comprises an arbitration unit in each processing unit, these arbitration units being linked, on each level, to a single common connection to request allocation of level priority, priority-allocation request connections in each case linking an allocation request output of an arbitration unit to priority-allocation request reception inputs of all other arbitration units on the same level, each common level priority-allocation request connection being linked to a corresponding priority-allocation request reception input in every arbitration unit.

In one recommended embodiment of the invention, all arbitration units are identical, each comprising a first elementary arbitrator, of a type known in the prior art, the inputs of which are connected to the corresponding priority-allocation request reception inputs of the relevant arbitration unit, and the output of which, corresponding to the rank of the elementary arbitrator, is connected to the first input of a first AND circuit with two inputs; a secondary elementary arbitrator, the inputs of which are connected to the corresponding level priority-allocation request reception inputs of the relevant arbitration unit, and the output of which, corresponding to the rank of the level to which the said arbitration unit belongs, is connected to the second input of a first AND circuits; a first OR circuit, the number of inputs of which corresponds to the number of arbitration units on the relevant level, each input of this OR circuit being connected to a priority-allocation request reception input of the relevant arbitration unit, and the output of this OR circuit being connected to the corresponding level priority-allocation request reception input corresponding to the rank of the level of the arbitration unit involved; and an acceleration circuit comprising a second AND circuit, the number of inputs of which is equal to the number of processing units on the level involved and the nulber of levels minus one, the first input of this second AND circuit being connected directly to the priority-allocation request output of the relevant processing unit, and each of the other inputs of this second AND circuit being connected through a logic reverser, firstly, to the priority-allocation request outputs of all other processing units on the same level as that of the unit involved, and secondly to the common level priority-allocation request connections of all other levels, this acceleration circuit further comprising a second OR circuit with two inputs, one of which is connected to the output of the first AND circuit with two inputs, and the other of which is conneted to the output of the second AND circuit, the output of this second OR circuit being connected through a D-type bistable flip-flop to the bus-utilization enablement input of the arbitration unit involved.

According to another feature of this invention, in order to standardize the printed-circuit cards, each comprising a processing unit with its arbitration unit, and a first portion of a connector, attached to these cards and plugged into, and thereby co-operating with, a second portion attached to the frame containing all system cards, the first portion of the connector of each card is connected, in the same way for all cards, to the priority-allocation request output, the output of the first OR circuit, all outputs of the first elementary arbitrator, all outputs of the secondary elementary arbitrator, the two inputs of the first AND circuit, and, through a logic reverser in each case, all inputs, except the first, of the second AND circuit; and in the second portion of the connector, the priority-allocation request output is wired to the corresponding reception input, the output of the first OR circuit to the corresponding level priority-allocation request reception input, the first input of the first AND circuit to the corresponding output of the first elementary arbitrator, the second input of the first AND circuit to he corresponding output of the second elementary arbitrator; and the terminals of the second portion of the connector are wired, firstly to all priority-allocation request reception inputs, except the one corresponding to the processing unit involved, and, secondly, to all level priority-allocation request reception inputs, except the one corresponding to the processing unit involved.

BRIEF DESCRIPTION OF THE DRAWINGS

It will be easier to understand this invention from reading the following detailed description of one embodiment, to which the invention is however in no way confined and which is illustrated in the accompanying drawings.

DETAILED DESCRIPTION OF A PREFERRED EMBODIMENT

Figure 1:
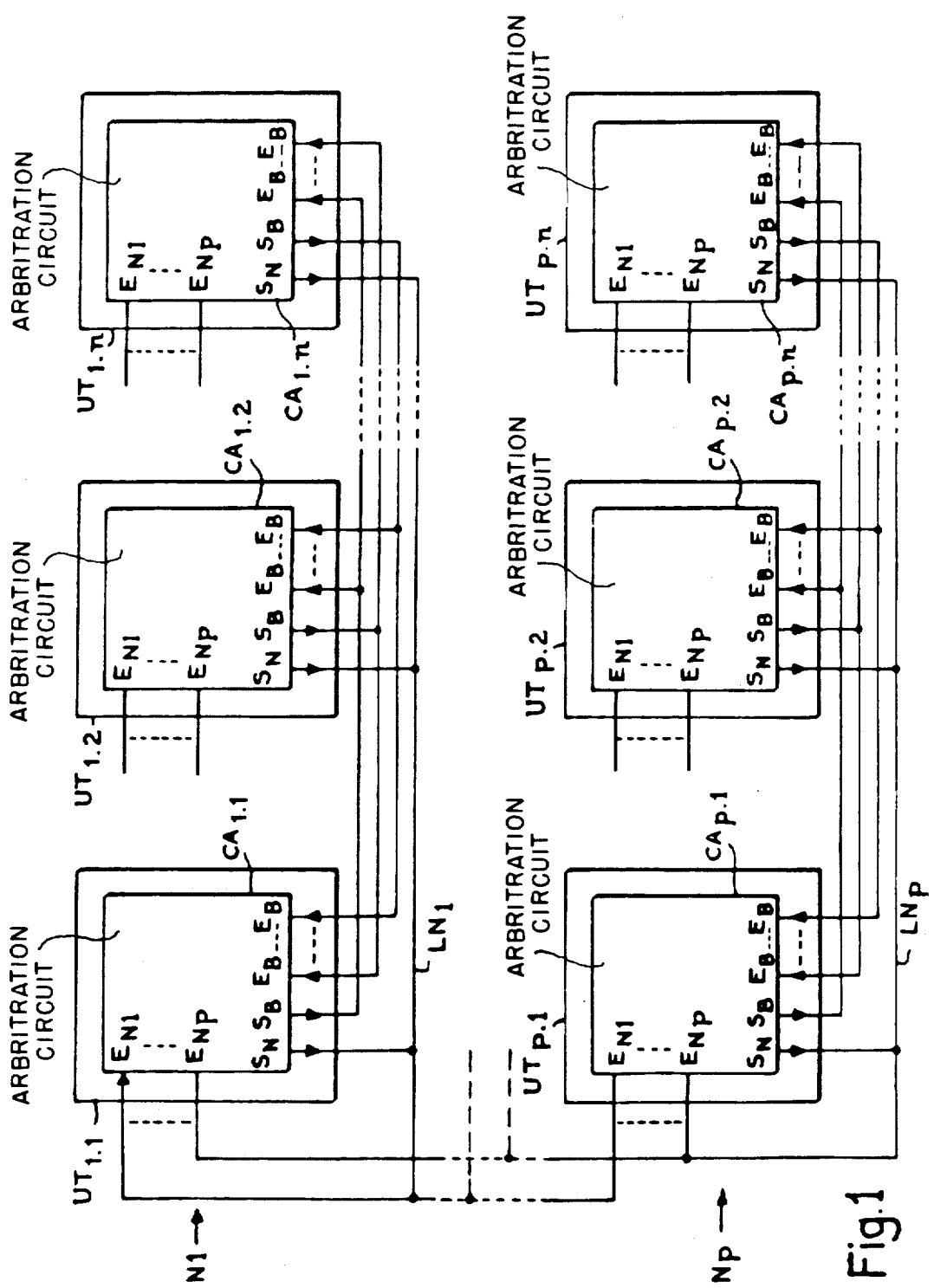
FIG. 1, showing a synoptic diagram of a multiprocessor system comprising an arbitration device as described in this invention.

The multiprocessor system, part of which is shown in FIG. 1, comprises $p \times n$ identical processing units, divided up among p levels, each level containing n units. Preferably, if the number $p \times n$ is a perfect square, p is equal to n; otherwise, p should be as close as possible to n, whether smaller or greater. In FIG. 1, processing units bear the references $UT_{1,1}$ to $UT_{1,n}$ for the first level, $UT_{2,1}$ to $UT_{2,n}$ for the second level, and so on up to level p, the units of which bear the references $UT_{p,1}$ to $UT_{p,n}$; and the levels of rank 1 to p bear the references N1 to Np. Each processing unit $UT_{1,1}$ to $UT_{p,n}$ comprises an individual arbitration circuit $CA_{1,1}$ to $CA_{p,n}$. All processing units $UT_{1,1}$ to $UT_{p,n}$ are connected to a common bus (not shown here).

Each individual arbitration circuit $CA_{1,1}$ to $CA_{p,n}$ comprises an individual bus-request at individual priority-allocation request output $S_B$, a relevant level priority-allocation request output $S_N$, several individual priority-allocation request reception inputs $E_B$, and several level priority-allocation request reception inputs $E_N$.

Each $E_B$ input on an individual arbitration circuit is connected to a corresponding $S_B$ output on all other individual arbitration circuits on the same level. Consequently, in the present case, each individual arbitration circuits comprises (n-1) $E_B$ inputs, and its $S_B$ output is connected to one $E_B$ input of all other individual circuits on the same level. In addition, as will be explained below in connection with FIG. 2, the bus request output on each individual arbitration circuit must be connected to its own bus request reception input. This connection may be provided internally in each individual circuit, as is the case in FIG. 1, where it is not shown. In order to ensure interchangeability of individual circuit cards, as explained below in connection with FIG. 2, the connection may also be provided at the level of card connectors, in which case each individual circuit comprises $n \times E_B$ inputs, one of which is connected externally to its own $S_N$ output.

All $S_N$ outputs of individual arbitration circuits on the same level are connected by means of an OR circuit, such as a wired OR (not shown here), to a common level connection, bearing the references LN1 to LNp for levels N1 to Np. Each $E_N$ input on each individual circuit is connected to a different level connection. Each individual arbitration circuit in this case therefore comprises $p \times E_n$ inputs.

Figure 2:
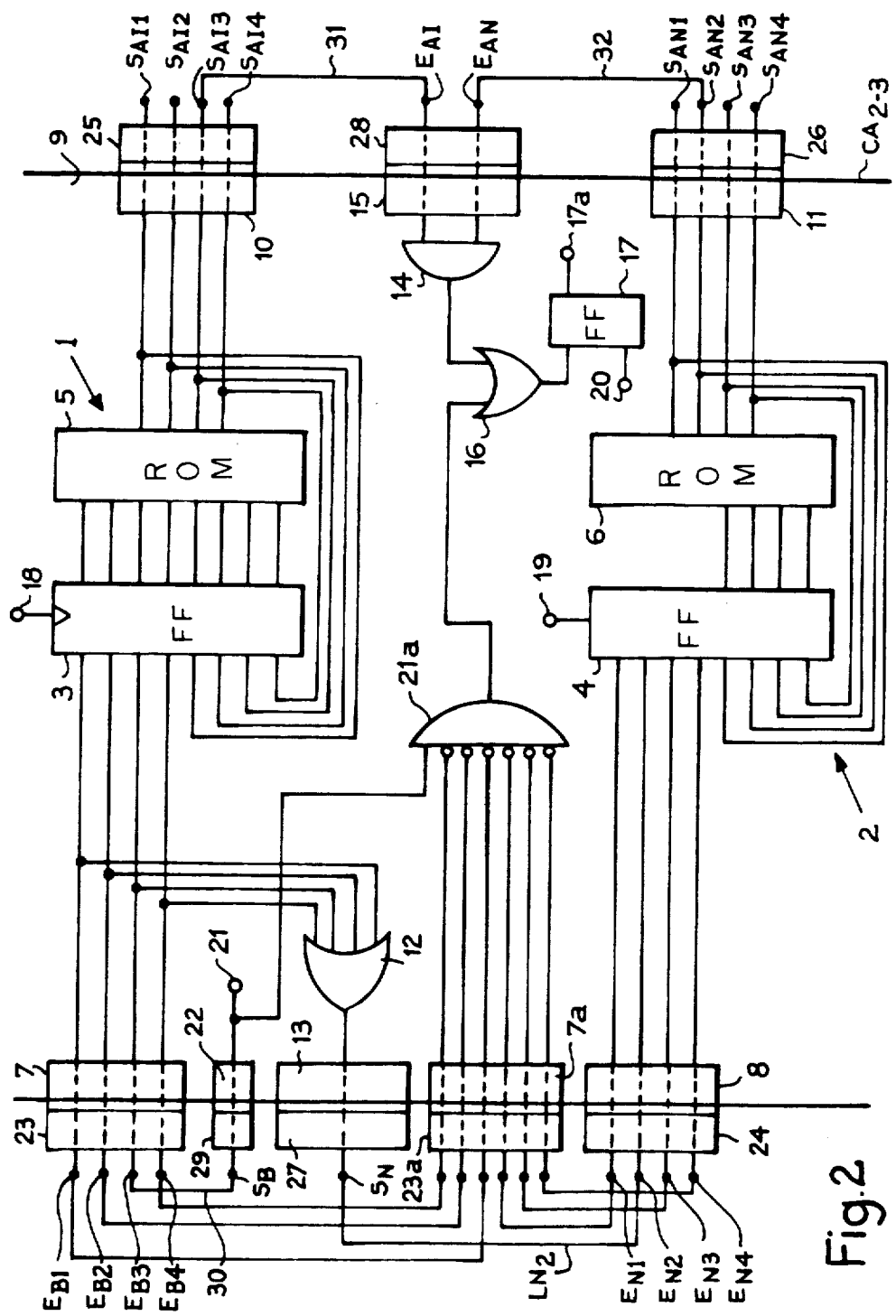
FIG. 2, showing the diagram of an arbitration unit belonging to the arbitration device shown in FIG. 1.

FIG. 2 shows a recommended embodiment of an individual arbitration circuit. This circuit bears the reference $CA_{l,m}$, which means that it is a circuit of rank m in the level of rank l. In the example shown in FIG. 2, $l=2$ and $m=3$, and the circuit is $CA_{2,3}$. On the hypothesis that $p \times n = 16$, p and n are preferably 4. However, the invention of course also applies to a multiprocessor system comprising any number of processing units. The number may even be a prime number, in which case levels N1 to Np contain different numbers of processing units.

The circuit $CA_{2,3}$ principally comprises two elementary arbitrators 1 and 2, of a type known in the prior art, according to the "Computer Design" article already referred to. Each of these elementary arbitrators comprises a register 3 and 4 of eight D-type bistable flip-flops, the eight outputs of which are connected to the eight addressing inputs of a read-only memory 5 and 6 with four outputs. The first four register inputs are connected to connectors 7 and 8, attached to the printed-circuit card 9 carrying the components of arbitration circuit $CA_{2,3}$, and if necessary the corresponding processing unit (not shown here, but which would bear the reference $UT_{2,3}$). The four outputs of read-only memories 5 and 6 are connected, on the one hand to connectors 10 and 11, and on the other hand to the four other inputs of the registers 3 and 4.

The first four outputs of the first register 3 are also connected to the four inputs of an OR circuit 12, the output of which is connected to connector 13 attached to printed circuit card 9.

The circuit $CA_{2,3}$ also comprises an AND gate 14 with two inputs. These two inputs are connected to a connector 15, and the output is connected to the first input of an OR gate 16, the output of which is connected to a D-type bistable flip-flop 17. The output of this flip-flop 17 is connected to a terminal 17a, which in turn is connected to the bus-utilization enablement input of the processing unit $UT_{2,3}$.

The clock signal inputs of flip-flops 3 and 4 are connected to terminals 18 and 19, which in turn are connected to an output of a suitable clock signal generator (not shown here). The clock signal input of flip-flop 17 is connected to a terminal 20, which in turn is connected to the said clock signal generator output. Terminals 18, 19 and 20 of all individual arbitration circuits are connected together to the same clock signal generator output.

The bus-request output (not shown here) of processing unit $UT_{2,3}$ is connected to a terminal 21 located on card 9, and connected to a connector 22 attached to this same card (in cases where $UT_{2,3}$ components are mounted on this card; otherwise, terminal 21 and connector 22 are not included). The $UT_{2,3}$ bus-request output is also connected to the first input of an AND gate 21a with seven outputs, the output of which is connected to the second input of the OR gate 16. Card 9 also has a connector 7a mounted on it with six terminals, each of which is connected to a corresponding input of AND gate 21a through a logic reverser; these six reversers may be incorporated in gate 21a.

Naturally, individual connectors 7a, 7, 8, 10, 11, 13, 15 and 22 may be combined in a single multiple connector, to simplify construction.

These eight connectors, attached to card 9, co-operate with corresponding additional connectors 23a and 23 to 29 attached to the frame (not shown here) carrying other components of the multiprocessor system to which circuit $CA_{2,3}$ belongs. These connectors may also be combined in a single multiple connector.

For convenience in describing and explaining, it is assumed that the first four inputs of registers 3 and 4 and the four outputs of memories 5 and 6 correspond, in the order of the drawing, from top to bottom, to the rank of arbitration circuits on the levels, or to the rank of levels, as the case may be. For example, the four pins of connector 23, which are connected on the card 9 side, through connector 7, to the first four inputs of register 3, are connected, externally of card 9, to the $S_B$ outputs of the four circuits $CA_{2,1}$ to $CA_{2,4}$. Only the connection 30 at the $S_B$ output of circuit $CA_{2,3}$ has been illustrated: this output is in fact the external connecting pin of connector 29. Because of the fact that only circuit $CA_{2,3}$ and the $EB_3$ inputs of circuits $CA_{2,1}$, $CA_{2,2}$ and $CA_{2,4}$, nor the connections between the $S_B$ outputs of these other circuits and terminals $E_{B1}$, $E_{B2}$ and $E_{B4}$, are shown here.

Since the circuit $CA_{2,3}$ is on level 2, its $S_N$ output, which is in fact the external connecting pin of connector 27, is linked by connection $LN_2$ to its input $E_{N2}$, which is in fact the second external connecting pin of the connector 24, and this pin is connected through connector 8, to the second input of register 4. Other connections between $S_N$ and $E_{N1}$, $E_{N3}$ and $E_{N4}$ and the corresponding inputs and outputs of all other arbitration circuits have not been included in FIG. 2.

The first three external connecting pins of connector 23a are connected to terminals $E_{B1}$, $E_{B2}$ and $E_{B4}$. The three other connecting pins are connected to terminals $E_{N1}$, $E_{N3}$ and $E_{N4}$.

The four outputs of memory 5, the individual enablement memory, are connected through connector 10 to the four external connecting pins of connector 25, which constitute four individual enablement output terminals $S_{A/1}$ to $S_{A/4}$. The four outputs of memory 6, the level enablement memory, are connected through connector 11, to the four external connecting terminals of connector 26, which constitute four level output terminals $S_{AN1}$ to $S_{AN4}$. The two external connecting pins of connector 28 constitute individual enablement and level enablement input terminals $E_{AI}$ and $E_{AN}$. Since the circuit shown in FIG. 2 is the third circuit on the second level, the pin $S_{AI3}$ of connector 25 is linked by connecting wire 31 to the pin $E_{AI}$ of connector 28, and the pin $S_{AN2}$ of connector 26 is linked by a connecting wire 32 to the pin $E_{AN}$ of connector 28.

The operation of the device described above will now be explained with reference to the case in which $p=n=4$. In this device, memories 5 and 6 of elementary arbitrators 1 and 2 of each individual arbitration circuit are programmed in the same way as described in the "Computer Design" article already referred to. However, unlike the process known in the prior art, and as explained in greater detail below, in this new process allocation of priorities is performed first in accordance with a principal cycle, in the course of which priority is distributed in a given order, preferably once during a cycle, to each of the levels requesting it, and subsequently, in accordance with a secondary cycle for each level in the course of which priority is distributed in a given order for each level, preferably once during a cycle, to each processing unit on that level claiming it. In addition, it should be noted that determination of present and future states of each processing unit or level may be done in different ways. In the simplest case, only two states are considered: master of bus or not. It is also possible to consider four different states, as in the embodiment illustrated in FIG. 2: at rest, master of bus, in reserve (i.e. due to be master of bus during the next principal or secondary cycle), and waiting (i.e. due to be master of bus during one of the principal or secondary cycles after the next cycle). It is also possible to consider either three states (eliminating the "waiting" state), or five or more states (by arranging the "waiting" state or states in order).

For the following explanaiton, the function of gate 21a will first be ignored, as if its output were not connected to the second input of OR circuit 16.

As soon as a bus allocation claim is issued by a processing unit, e.g. $UT_{2,3}$, in the form of a logic "1", this signal appears at the $S_B$ ouput of this unit. The $S_B$ output of circuit $CA_{2,3}$ of unit $UT_{2,3}$ is connected to the $E_{B3}$ inputs of all arbitration circuits of processing units on level 2, so that each of these circuits knows, because of the corresponding addressing of its memory 5, that circuit $CA_{2,3}$ has requested allocation of the bus, as soon as an active front of the clock signal is applied to terminals 18 and 19. In addition, a "1" appears at the output of OR circuit 12 of circuit $CA_{2,3}$, and is transmitted to the $E_{N2}$ inputs of all individual arbitration circuits. As soon as the active front of the clock signal is applied to terminals 18 and 19, each individual arbitration circuit, more specifically those on levels N1, N3 and N4, knows, because of the corresponding addressing of its memory 6, that a bus-allocation request is being made by at least on of the circuits on level N2. Consequently, if no other request is issued by individual arbitration circuits on levels N1, N3 and N4, memory 6 of circuit $CA_{2,3}$ produces a "1" at outputs $S_{AN2}$. In addition, if no other processing unit on level N2 issued a request, memory 5 of circuit $A_{2,3}$ produces a "1" at output $S_{AI3}$. The AND gate 14 therefore receives a "1" at each of its two inputs, and produces a "1" at its output. As soon as a second active front of the clock signal is applied to terminal 20 of flip-flop 17, a "1" appears on terminal 17a, and processing unit $UT_{2,3}$ is enabled to use the bus to which it is connected.

What happens in the same case (i.e. with only processing unit UT$_{2,3}$ requesting priority) will now be described, taking into account of gate 21a. As soon as processing unit UT$_{2,3}$ requests priority, i.e. as soon as a "1" appears at terminal 21, gate 21a has a "1" at its first input, and also "1" at each of its six other inputs. Since no other processing unit requests use of the bus, an "0" appears at each one of terminals E$_{B1}$, E$_{B2}$, E$_{B4}$, and E$_{N1}$, E$_{N3}$, E$_{N4}$; accordingly, a "1" appears at each of the outputs of the reverser connected to the six other gate 21a inputs. Consequently, a "1" appears at gate 21a output, and therefore at gate 16 output. As soon as a first active front of the clock signal is produced, flip-flop 17, the particular, is activated, and a "1" appears at its output terminal 17a, and processing unit UT$_{2,3}$ is immediately enabled to use the bus. In addition, this first active front of the clock signal activates registers 3 and 4, and memories 5 and 6 are therefore addressed, as already described, and they produce a "1" at outputs S$_{AB}$ and S$_{AN3}$, and therefore a "1" at the output of gates 14 and 16. The second active front of the clock signal activates flip-flop 17 in particular, and a "1" appears at its output 17a, confirming the "1" resulting from the first active front of the clock signal and which has appeared previously at terminal 17a.

Naturally, if another processing unit requests use of the bus between the first and second active fronts of the clock signal, the second active front modifies the addressing of memories of the corresponding individual arbitration circuits, and an "0" will appear at output S$_{AB}$. Accordingly, unit UT$_{2,3}$ will have performed one elementary operation between the first and second active fronts of the clock signal, because of the "1" produced by gate 21a, and another elementary operation between the second and third active fronts of this clock signal, because of the "1" produced by memory 5, when addressed by the first active front, then between the third and fourth active fronts the other processing unit performs an elementary operation. In other words, the circuit comprising AND gate 21a is a priority-allocation acceleration circuit, allowing the start of processing performed by the processing unit in question to be brought forward by a clock signal period, without awaiting the second active front of this signal.

In all other cases, namely when several processing units simultaneously claim use of the bus, an "0" is present at the output of AND gate 21a, and it is consequently inactive. No account will therefore be taken of gate 21a in the remainder of this explanation, concerning these other cases.

If two or more processing units simultaneously claim use of the bus, on level N2 alone, only the individual enablement memory of the processing unit with highest-rated priority at the point in time issues an "1" at the corresponding individual enablement output. In addition, all level enablement memories of arbitration circuits on level N2 produce a "1" at output S$_{AN2}$ of each of these circuits. Consequently, only the AND gate of the individual arbitration circuit of the highest-priority processing unit is enabled to a "1" at each of its two inputs, and only this processing unit is enabled to use the bus. As soon as this unit has performed an elementary operation (reading or entering a word, for example), priority passes to the next processing unit in the order of priority that has issued a request, and each unit performs one elementary operation. If, at the end of this first priority-allocation cycle, one or more processing units still have other elementary operations to perform, other priority-allocation cycles take place, until all requests have been satisfied.

If, at any moment during a cycle to allocate priority to processing units on level N2, processing units belonging to other levels issue busallocation requests, priority is withdrawn from level 2 as soon as the elementary operation in progress at the moment is completed. A "1" appears on each of the common level connections LN$_1$, LN$_3$ or LN$_4$ corresponding to the levels on which these requests occur, and these "1"s appear at the corresponding inputs E$_{N1}$, E$_{N3}$ or E$_{N4}$ of all individual arbitration circuits, particularly those on level N2. Level enablement memories of individual circuits on level N2 therefore recive a new addressing configuration, as soon as an active clock signal front is applied, just after the said point in time, on terminals such as 19. This new configuration produces an "0" at outputs S$_{AN2}$ of all individual circuits on level N2, which has the effect of withdrawing priority from level N2. In addition, level enablement memories of individual circuits on the level from which at least one request has come, and which takes next highest priority to level N2, e.g. N3, then produce a "1" at the corresponding outputs S$_{AN3}$. The highest-priority processing unit on level N3 is enabled to use the bus for a single elementary operation. Priority then passes immediately to the level with next highest priority and from which a request has come, and the highest priority processing unit on this level is also enabled to use the bus for a single elementary operation. As soon as all levels from which requests have issued have received priority, so that their highest priority processing unit can perform one elementary operation, namely at the end of the first principal cycle, priority returns to level N2, and a second principal cycle starts. During this second principal cycle, priority is allocated once to each level on which at least one request remains to be met, and on each level priority is allocated to the processing unit with next highest priority on that level after the one that had priority during the first principal cycle. After completion of the second principal cycle, other principal cycles occur, as long as any requests remain; these cycles may be different, if no further requests remain in one or more levels after completion of any of any principal cycle, and/or if new requests come from a level where there were none previously. When several requests occur on a single level, priority is allocated in the course of a secondary cycle. If n processing units on the same level request use of the bus, n principal cycles are needed to perform a single secondary cycle on this level. The details supplied above, and the "Computer Design" article, will allow anyone skilled in the art to programme memories 5 and 6 without any difficulty.

In the recommended embodiment illustrated in FIG. 2, all individual arbitration circuits CA$_{1,1}$ to CA$_{p,n}$ are identical with circuit CA$_{2,3}$, and all their memories are programmed exactly like memories 5 and 6 respectively. Only connections LN$_2$, 30, 31 and 32 and those of connector 23a, outside the printed-circuit cards containing individual circuit components, are specific to each individual processing unit. Consequently, printed-circuit cards containing individual arbitration circutis, and, if necessary, corresponding processing units, are all interchangeable, which facilitates maintenance of this new multiprocessor system.

Distribution of processing units among several levels or even sublevels makes it possible to have fairly simple and easily produced individual arbitration circuits, even when the system comprises a very large number of processing units. Read-only memories are very easy to programme, because of their fairly small capacity: in the case of a multiprocessor system containing sixteen processing units, which may be regarded as extremely complex, memories 5 and 6 are identical, and are of a very common type, with 256×4 bits.

In this new process, it is also possible to change the order of priorities at any time, for instance by replacing one or more of the read-only memories of individual arbitration circuits by other memories, differently programmed. These may be selected by any manually-operated arrangement device, or by the actual multiprocessor system. Live memories may also be used instead of read-only memories, their contents being altered by suitable means known in the prior art.

In addition levels can be subdivided into sub-levels, in which case the elementary arbitrator 2 becomes the sub-level arbitrator, and an additional elementary arbitrator is provided in each individual arbitration circuit, connected up in the same way as arbitrator 2, with is input connected to the output of another OR gate, the inputs of which are connected in parallel with the inputs of elementary arbitrator 2, and its appropriate output connected to a third input of AND gate 14, which is consequently provided.

This invention is of course in no way confined to use with a multiprocessor system, but may be applied to any system in which arbitration is necessary among several units using a common communication path.

What is claimed:

1. Apparatus for decentrally allocating resource priority among the individual processing units in a multiprocessor system, each unit being assigned to a processing level and an individual position within that level, said apparatus including a plurality of arbitration means, each one coupled to a corresponding unit and to all other arbitration means in said system, each arbitration means comprising:

first logic means for receiving at each of a plurality of first inputs, each input being coupled to all arbitration means of a given processing level, a first indicating signal indicating whether a request for resource access has been made by a unit of said given level, and for producing a first output signal at one of a plurality of first outputs, each output being coupled to arbitration means of one of said levels, said first output signal indicating which level will be granted priority in accordance with said first indicating signal and priority data stored in said first logic means, level priority being granted sequentially to all requesting levels;

second logic means for receiving at each of a plurality of second inputs, each second input being coupled to a given unit with a same level as said corresponding unit, a second indicating signal indicating whether a request for resource access has been made by said given unit, and for producing a second output signal at one of a plurality of second outputs, said second output signal indicating which unit will be granted priority in accordance with said second indicating signal and priority data stored in said second logic means, unit priority being granted sequentially to all requesting units, and level priority having priority over unit priority;

third logic means connected to one of said first outputs and to one of said second outputs for producing a signal granting resource access to said corresponding unit when said first and second output signals indicate that level and unit priority are to be granted to said corresponding unit; and means responsive to a request for resource access by said corresponding unit for producing a third output signal to be applied to one of said second inputs of said second logic means and to second inputs of said second logic means of other arbitration means on said given level, and for producing a fourth output to a applied to one of said first inputs of arbitration means of other levels.

2. Apparatus as in claim 1 including fourth logic means for receiving said first and secon dinputs for all other arbitration means and producing said signal granting resource access when said first and second input signals indicate no other unit is requesting access to said resource.

* * * * *